(12) United States Patent
Chandra

(10) Patent No.: US 8,605,098 B2
(45) Date of Patent: Dec. 10, 2013

(54) MEMORY STRUCTURE FOR OPTIMIZED IMAGE PROCESSING

(75) Inventor: Mahesh Chandra, Delhi (IN)

(73) Assignee: STMicroelectronics International N.V., Amsterdam (NL)

( * ) Notice: Subject to any disclaimer, the term of this patent is extended or adjusted under 35 U.S.C. 154(b) by 1746 days.

(21) Appl. No.: 11/648,125

(22) Filed: Dec. 29, 2006

(65) Prior Publication Data

US 2007/0204096 A1    Aug. 30, 2007

(30) Foreign Application Priority Data

Dec. 30, 2005    (IN) .......................... 3549/DEL/2005

(51) Int. Cl.
*G06T 1/60*    (2006.01)
(52) U.S. Cl.
USPC .......................................... 345/530; 345/649

(58) Field of Classification Search
USPC ................................................ 345/530, 649
See application file for complete search history.

(56) References Cited

U.S. PATENT DOCUMENTS 6,757,447 B2 *    6/2004  Yamaguchi et al. .......... 382/293
7,340,591 B1 *    3/2008  Pechanek et al. ............. 712/217
2001/0036322 A1 * 11/2001  Bloomfield et al. .......... 382/276

* cited by examiner

*Primary Examiner* — Maurice L McDowell, Jr.
(74) *Attorney, Agent, or Firm* — Munck Wilson Mandala, LLP

(57) ABSTRACT

A memory architecture for image processing comprising a memory array having multiple multi-byte memory data paths of equal multi-byte data width, and a multiplexing structure connected to the output of the multiple multi-byte data paths, capable of selectively providing a multi-byte data path of a desired width containing a desired permutation of bytes chosen from one or more of the multiple data paths.

20 Claims, 3 Drawing Sheets

MEMORY STRUCTURE FOR OPTIMIZED IMAGE PROCESSING

CROSS-REFERENCE TO RELATED APPLICATIONS

This patent application claims priority under 35 U.S.C. §119(a) to Indian Patent Application No. 3549/Del/2005 entitled "MEMORY STRUCTURE FOR OPTIMIZED IMAGE PROCESSING" filed on Dec. 30, 2005, which is hereby incorporated by reference. Indian Patent Application No. 3549/Del/2005 is assigned to the assignee of the present application and is hereby incorporated by reference into the present disclosure as if fully set forth herein. The present application hereby claims priority under 35 U.S.C. §119(a) to Indian Patent Application No. 3549/Del/2005.

TECHNICAL FIELD

The present disclosure relates to memory structures and in particular to memory structures for image rotation and mirroring.

BACKGROUND

Image processing is an essential function of a vast majority of modern day devices, ranging from computing systems to consumer devices such as cell phones and Personal Digital Assistants (PDAs). The human interfaces for these devices are becoming increasingly graphical in nature in order to provide a more user friendly interface. These graphical user interfaces (GUIs) are also increasing in sophistication as greater computing power becomes available in these devices.

Conventional image processing systems typically require relatively large memory structures that store the images. The image processing activity involves the manipulation of this large amount of imaging data at very high speeds so as to enable real-time visualization of the images and the movement of those images. Typical operations include image translation and rotation. This high-speed manipulation of the image data is performed by signal processors, general purpose processors or special purpose image processors. These image processing engines access the image data in the memory through high-speed busses that connect them together.

Conventional memory systems are designed for meeting the needs of normal non-imaging data processing functions. As such, conventional memory systems are designed for normal sequential memory access. When such conventional memory systems are used for image processing, the image data (pixels) are packed to improve the memory utilization, for example, if memory data width is 64-bits then it will contain four 16-bit pixels or two 24-bit pixels and two bytes of the third pixel. The resulting performance is less than optimal as the typical frequently used functions of image translation or rotation very often require non-sequential memory access. Consequently, several memory accesses are required for each step of the image processing function resulting in inefficient and slow operation for a given clock speed.

Conventional systems attempt to improve the performance of a memory system that is used for image rotation by 90 degrees or a multiple of 90 degrees. For example, conventional system move image data from an initial position to a subsequent position involving rotation by 90 degrees or a multiple of 90 degrees with or without image translation. Typically, such systems focus on determining the optimum movement of the data regardless of the speed of accessing data from the memory without addresses the issues relating to the speed and efficiency of accessing the data from the memory, hence its effectiveness is limited by the memory access mechanism.

There is therefore a need for memory architectures for efficient image processing applications that involve image rotation by 90 degrees or a multiple of 90 degrees.

SUMMARY

One embodiment of the present disclosure provides a memory architecture that is efficient for image rotation by 90 degrees or a multiple of 90 degrees. In one embodiment, the present disclosure may be extended to implement rotation by any amount with at par or better performance than the conventional architecture.

In one embodiment, the present disclosure provides a memory architecture for image processing. The memory architecture includes a memory array having multiple multi-byte memory data paths of equal multi-byte data width. The memory architecture also includes a multiplexing structure connected to the output of the multiple multi-byte data paths, capable of selectively providing a multi-byte data path of a desired width containing a desired permutation of bytes chosen from one or more of the multiple data paths.

In another embodiment, the present disclosure provides a method of providing efficient memory architecture for image processing. The method includes structuring the memory architecture as a multi-byte memory array having multiple data paths of equal multi-byte data width. The method also includes providing a multiplexing structure at the output of the memory array that selectively provides a multi-byte data path of a desired width containing a desired permutation of bytes chosen from one or more of the multiple data paths.

In still another embodiment, the present disclosure provides a memory architecture for image processing. The memory architecture includes a memory array having multiple multi-byte memory data paths of equal multi-byte data width. The memory architecture also includes a multiplexing structure connected to the output of the multiple multi-byte data paths. The multiplexing structure is capable of selectively providing a multi-byte data path of a desired width containing a desired permutation of bytes chosen from one or more of the multiple data paths. The memory architecture is capable of at least one of: rotating an image, separating an image into luma and chroma planes, image mirroring and generating planar data from an image.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Embodiments of the present disclosure enable efficient utilization of the system bus bandwidth for image manipulation functions. A preferred embodiment of the disclosure, shown in FIG. 1, uses six memory cuts each of forty eight data width, along with simple read write control logic and a data multiplexer.

Figure 1:
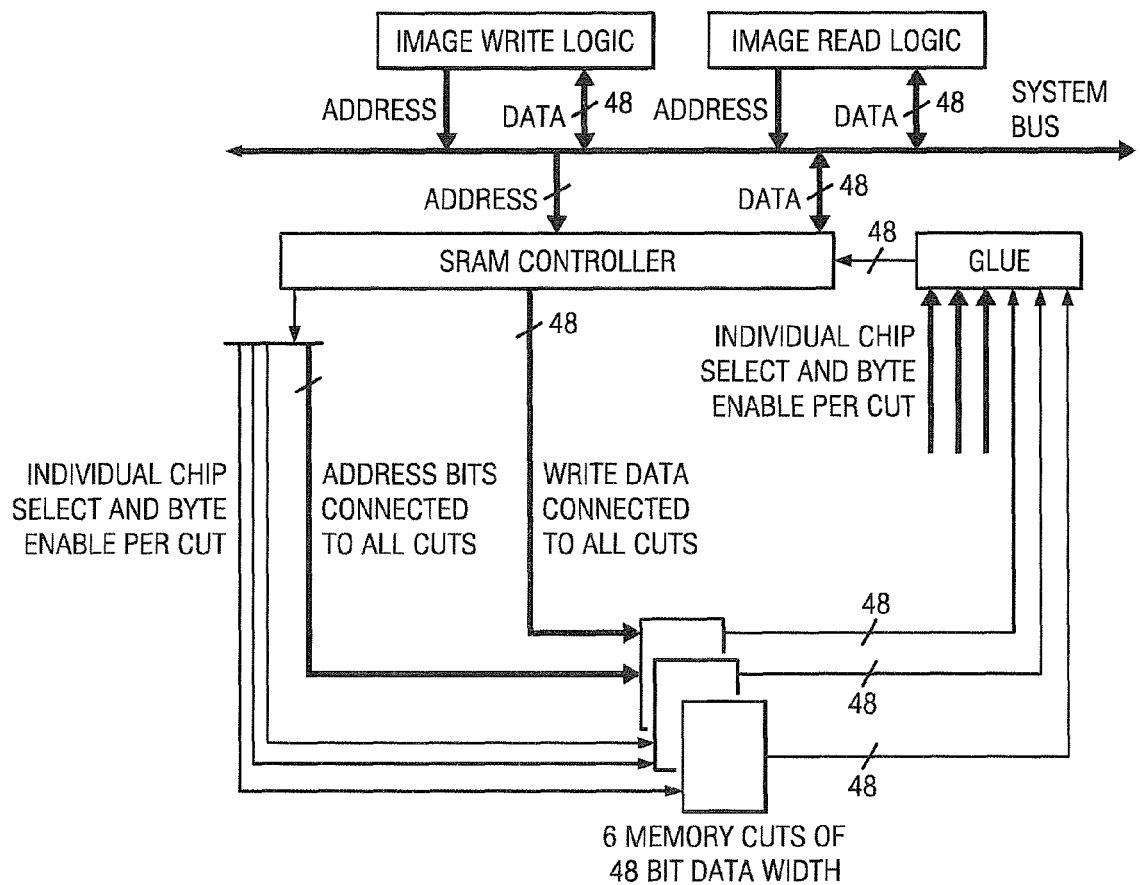
FIG. 1 is an exemplary block diagram of a preferred embodiment of the present disclosure.

The embodiment shown in FIG. 1 is capable of the best bus performance for the 16-bits and 24-bits per pixel modes. This structure can be extended to support other formats with slight alteration. These signals are used in the data multiplexer to pack the data so that all the bits can be used. The data read and data write logic blocks are connected with the system bus for receiving data inputs and control signals.

In a preferred embodiment, the data width used is 48-bits wide. However, this is not a necessary restriction and the data width can be adjusted according to requirements. The memory system is preferably organized as six equal memory cuts of 48-bit wide data each. A 48-bit wide data width ensures that each single pixel is addressed in each access. The individual chip select and byte select signals are generated for each of the six memory cuts of 48-bit data width, which are, in turn, connected to the data multiplexer for multiplexing the received data and sent back to the SRAM through its 48-bit data bus. Data multiplexing information has the multiplexing information that is to be used by the glue logic. In one embodiment, the system utilizes two level multiplexing, in which the first level decides which combination of bytes from different cuts make a valid combination depending on the selected mode, rotation of the data and the second level selects one of them should be selected.

Figure 2:
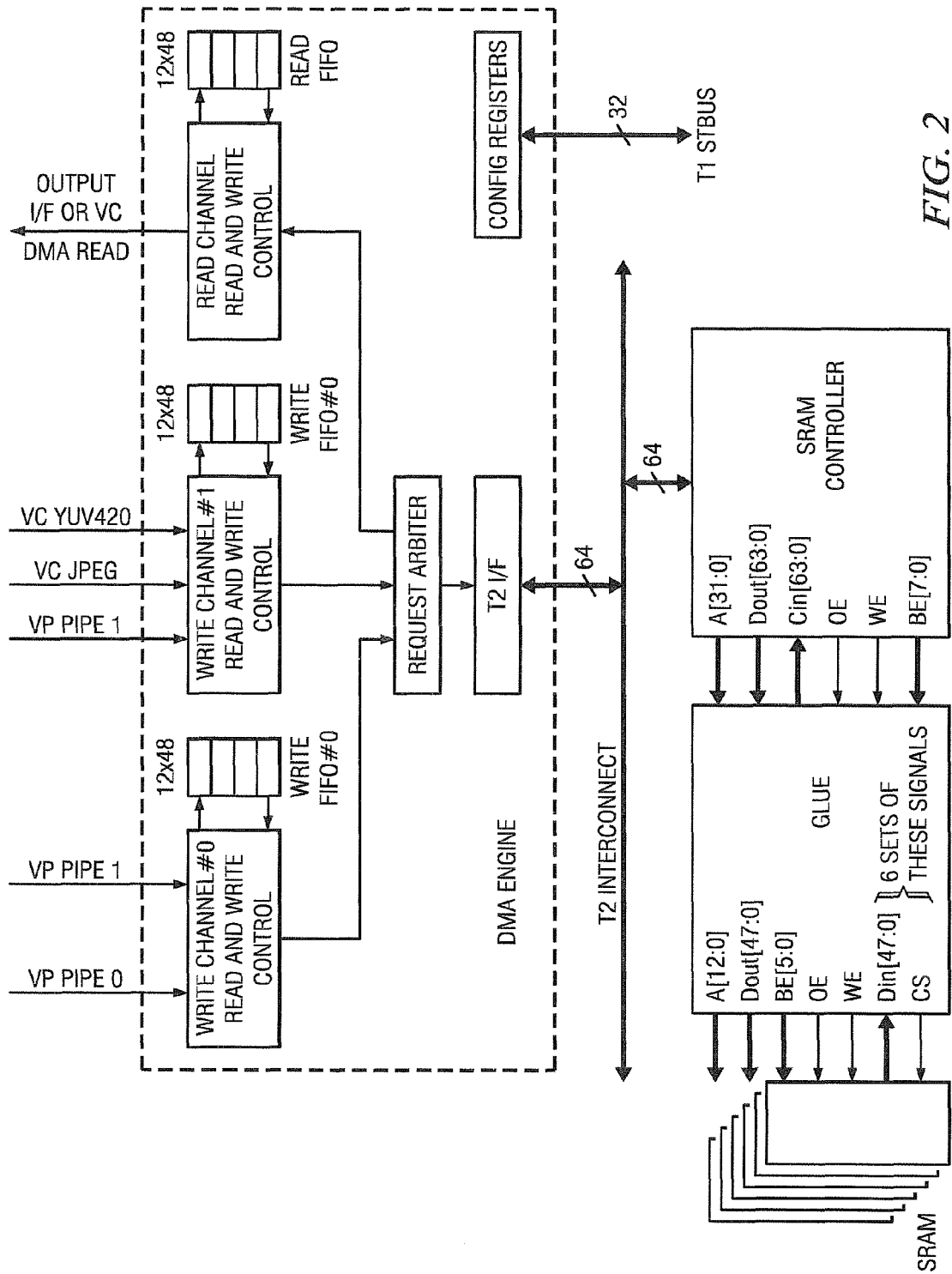
FIG. 2 is an exemplary block diagram of the Read and Write Logic blocks, in the preferred embodiment.

FIG. 2 describes a system block diagram of the read and write processes according to one embodiment of the present disclosure. The system includes two write channels and one read channel with associated read and write control blocks (Write Channel#0,1 and Read channel), bi-directional Write FIFO memories and Read FIFO memory of size 12*48, Request Arbiter, system bus (STBUS T2 in this particular case) I/F, system bus interconnect, configuration registers, SRAM controller, and Glue Logic and SRAM controller. The Write Channels#0 and 1 receive data and control signals and are coupled to bi-directional Write FIFO memories by read and write control blocks. The write channels are further coupled to the Request Arbiter, which in turn is connected to system bus I/F block. This in turn is connected bi-directionally to a system bus interconnect bus which also connects to the SRAM controller which transmits and receives data from the Glue Logic. The glue logic is connected to SRAMs with 6 sets of these signals. Configuration Registers are connected on the system register bus interface (STBUS T1 in this particular case). In one embodiment, the Request Arbiter is coupled to a Read Channel for outputting data on receiving a read request. The Read Channel is also bi-directionally coupled to the Read FIFO.

Figure 3:
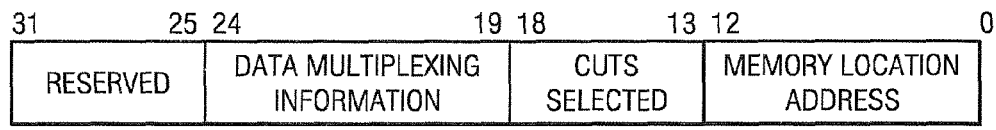
FIG. 3 illustrates the format of the address bus, in the preferred embodiment.

FIG. 3 shows the format of the address bus, in the preferred embodiment. The read and write to SRAM are performed in a manner such that only a small glue logic is required between the SRAM controller and the SRAM. This also allows the use of the existing SRAM Controllers. The address bus in system bus is 32-bit wide and all the bits are not used if we use a 256 KBytes memory. Hence, upper memory addresses can be used for sending data multiplexing and cut selection information. In one embodiment, the 32-bits of address bus are split as shown.

Memory location address is the address passed to the memory cuts. The same address is also passed to all the memory cuts. The Cut selected field has one bit for each cut. If the bit is '1' then corresponding memory cut is selected (chip select is asserted) and if the bit is 'O', memory cut is not selected (chip select de-asserted). Bit 13 corresponds to cut0, 14 to cut 1 and so on. Thus, bit 18 corresponds to cut5. According to one embodiment of the present disclosure, more than one cut may be selected at the same time.

Figure 4:
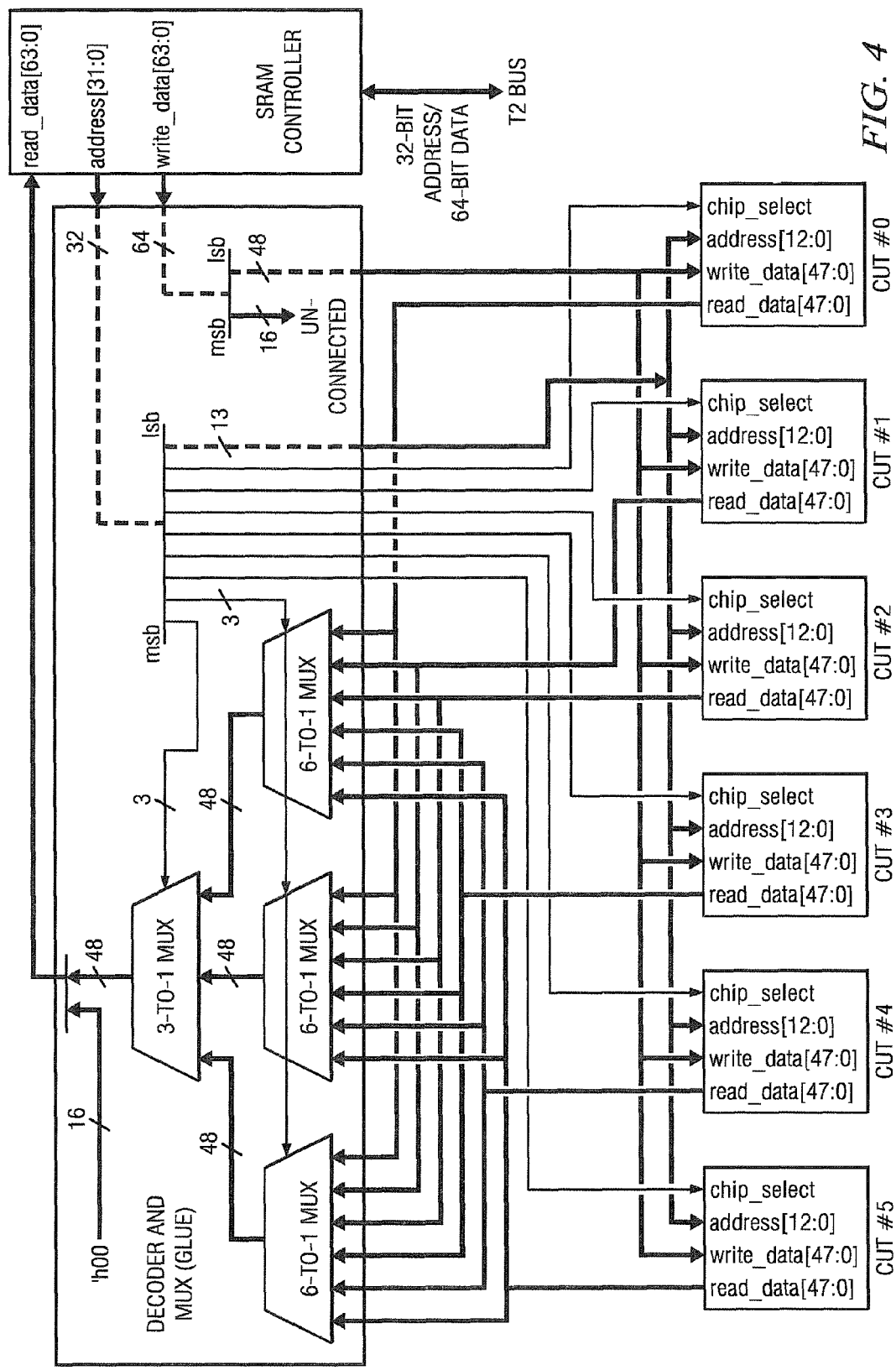
FIG. 4 illustrates the internal structure of the multiplexing arrangement in the preferred embodiment.

FIG. 4 shows the internal structure of the Data path multiplexers. Data multiplexing information has the multiplexing information that is to be used by the glue logic. Two level multiplexing is used. The first level decides which bytes of different cuts make a valid combination depending on modes (rotation etc.) and the second level decides which one of them is selected. The multiplexing modes are given in the Table 1 below.

TABLE 1

| | Data Multiplexing During SRAM Reads | | | |
|---|---|---|---|---|
| | | Bit 5:3 | | |
| Bit 2:0 | 000 | 010 | 011 | $001^a$, 100-111 |
| 000 | $D_{05}D_{04}D_{03}D_{02}D_{01}D_{00}{}^b$ | $D_{21}D_{20}D_{11}D_{10}D_{01}D_{00}$ | $D_{12}D_{11}D_{10}D_{02}D_{01}D_{00}$ | RESERVED$^c$ |
| 001 | $D_{15}D_{14}D_{13}D_{12}D_{11}D_{10}$ | $D_{23}D_{22}D_{13}D_{12}D_{03}D_{02}$ | $D_{15}D_{14}D_{13}D_{05}D_{04}D_{03}$ | RESERVED |
| 010 | $D_{25}D_{24}D_{23}D_{22}D_{21}D_{20}$ | $D_{25}D_{24}D_{15}D_{14}D_{05}D_{14}$ | $D_{32}D_{31}D_{30}D_{22}D_{21}D_{20}$ | RESERVED |
| 011 | $D_{35}D_{34}D_{33}D_{32}D_{31}D_{30}$ | RESERVED | $D_{35}D_{34}D_{33}D_{25}D_{34}D_{23}$ | RESERVED |
| 100 | $D_{45}D_{44}D_{43}D_{42}D_{41}D_{40}$ | $D_{51}D_{50}D_{41}D_{40}D_{31}D_{30}$ | $D_{52}D_{51}D_{50}D_{42}D_{41}D_{40}$ | RESERVED |
| 101 | $D_{55}D_{54}D_{53}D_{52}D_{51}D_{50}$ | $D_{53}D_{52}D_{43}D_{42}D_{33}D_{32}$ | $D_{55}D_{54}D_{53}D_{45}D_{44}D_{43}$ | RESERVED |
| 110 | RESERVED | $D_{55}D_{54}D_{45}D_{44}D35D_{34}$ | RESERVED | RESERVED |
| 111 | RESERVED | RESERVED | RESERVED | RESERVED |

Still referring to Table 1, 010 and 011 are chosen so that BYTES_PER_PIXEL setting can directly be used (no logic required to generate select signals). 000 is used when the data read write is sequential (non-rotation modes) and 010 or 011 is used when rotation is required. $D_{nm}$ means data byte m of memory cut n. The order is as it would appear in D[47:0]. Also in Table 1, "Reserved" indicates that it can be used if required for other modes 420 planar.

The addressing scheme for writing data in different modes will be different and is shown in Table 2.

TABLE 2

| | Memory Access Example for Data Write | | | | | | |
|---|---|---|---|---|---|---|---|
| | | | | Cut no/ Address | | | |
| Line/ Data$^a$ | Nor- mal | Line/ Other | Data | Cut no/Address Normal | Line/ Other | Data | Cut no/Address Normal | Other |
| 0, 0 | 0/0 | 0/0 | 1, 0 | (j + 1)/k | 1/0 | 2, 0 | (j' + 1)/k' | 2/0 |
| 0, 1 | 1/0 | 0/1 | 1, 1 | (j + 2)/k | 1/1 | 2, 1 | — | 2/1 |

TABLE 2-continued

Memory Access Example for Data Write

| Line/ Data[a] | Cut no/ Address Normal | Other | Line/ Data | Cut no/Address Normal | Other | Line/ Data | Cut no/Address Normal | Other |
|---|---|---|---|---|---|---|---|---|
| 0, 2 | 210 | 0/2 | 1, 2 | — | 1/2 | 2, 2 | 5/k' | 2/2 |
| 0, 3 | 3/0 | 0/3 | 1, 3 | 5/k[b] | 1/3 | 2, 3 | 0/(k' + 1) | 2/3 |
| 0, 4 | 4/0 | 0/4 | 1, 4 | 0/(k + 1) | 1/4 | 2, 4 | 1/(k' + 1) | 2/4 |
| 0, 5 | 5/0 | 0/5 | 1, 5 | 1/(k + 1) | 1/5 | 2, 5 | 2/(k' + 1) | 2/5 |
| 0, 6 | 0/1 | 0/6 | 1, 6 | 2/(k + 1) | 1/6 | 2, 6 | 3/(k' + 1) | 2/6 |
| 0, 7 | 1/1 | 0/7 | 1, 7 | 3/(k + 1) | 1/7 | 2, 7 | 4/(k' + 1) | 2/7 |
| ... | ... | ... | ... | ... | ... | ... | ... | ... |
| ... | ... | ... | ... | ... | ... | ... | ... | ... |
| 0, n[c] | j/k[d] | 0/m[e] | 1, n | j'/k' | 1/m | 2, n | j"/k" | 2/m |

Still referring to Table 2, "Data" is 48-bits which means 2 or 3 pixels depending on 3 Bytes/pixel 2 Bytes/pixel. It (cut no=5) is not necessarily for 1,3 (line/data). It can be for any data depending on the value of j. It'll start here if j=1. Same is true for 2,2 (5/k', it's only if j'=2). In Table 2, "n" is the data for last pixel of the line.

In addition, j (or j' or j") and k (or k' or k") in Table 2 are the cut no. and address respectively for the last data of the line. Finally, m (or m' or m") is the address for the last data of the line. Note that the 6th line will start at (m+1) address of cut 0. Similarly, 7th at (m'+1) address of cut 1 and so on. m is also referred to as line_pitch in the following description and tables.

For read operations, the address generation logic needs to take care of the image transformation mode. Following table shows an example of data read pattern for 90 degree rotated image.

TABLE 3

Memory Access Example for Data Read

| Output Line/ pixel | Input Line/ pixel | Cut no/Address[a] 16-bit Color Mode | 24-bit Color Mode |
|---|---|---|---|
| 0, 0 | 0, n | 0, 1, 2/LINE_PITCH-1 | 0, 1/LINE_PITCH-1 |
| 0, 1 | 1, n | | |
| 0, 2 | 2, n | | 2, 3/LINE_PITCH-1 |
| 0, 3 | 3, n | 3, 4, 5/LINE_PITCH-1 | |
| 0, 4 | 4, n | | 4, 5/LINE_PITCH-1 |
| 0, 5 | 5, n | | |
| 0, 6 | 6, n | 0, 1, 2/(2*LINE_PITCH)-1 | 0, 1/(2*LINE_PITCH)-1 |
| 0, 7 | 7, n | | |

Table 3 above illustrates memory access examples for data read. Byte enabled must be asserted accordingly.

Accordingly, one embodiment of the present disclosure provides a memory architecture that is efficient for image rotation by 90 degrees or a multiple of 90 degrees. It can also be extended to implement rotation by any amount with at par or better performance than the conventional architecture. It is also an object of the present disclosure to provide a memory architecture that is efficient for image mirroring, flipping and generating planar data (separating image into separate luma and chroma planes).

In addition, one embodiment of the present disclosure provides a memory architecture in which the memory is arranged to provide multiple data paths of a wide multi-byte data width. The individual bytes of each data path are combined in a configurable manner based on the desired image processing operation to produce a variable data path of the desired multi-byte data width that provides efficient memory access for the desired operation. The multiplexing structure can be configured to provide different sets of byte permutations based on changing requirements It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A memory architecture for image processing, the memory architecture comprising:
    a memory array, the memory array comprising multiple multi-byte memory data paths of equal multi-byte data width; and
    a multiplexing structure connected to outputs of the multiple multi-byte data paths, the multiplexing structure configured to selectively provide multi-byte data of the multi-byte data width containing a permutation of bytes chosen from among combinations of bytes on one or more of the data paths selected based on rotation, if any, of an image corresponding to the selected bytes.

2. The memory architecture according to claim 1, wherein the multiplexing structure comprises a two-level hierarchy of multiplexers, wherein a first level of multiplexers is configured to select combinations of bytes that are valid based on the image rotation, if any, and a second level of multiplexers is configured to receive an output from the first level of multiplexers.

3. The memory architecture according to claim 2, wherein the second level of multiplexers is configured to select one of the created permutations of multi-byte data based on the desired image rotation operation.

4. The memory architecture according to claim 1, wherein the multiplexing structure comprises a two-level hierarchy of multiplexers, wherein a first level of multiplexers is configured to combine one or more individual bytes from the one or more multi-byte data paths to create permutations of multi-byte data of the multi-byte data width based on a desired image rotation operation.

5. The memory architecture according to claim 1, wherein the multiplexing structure is configurable to provide different permutations of byte combinations based on changing image rotation requirements.

6. The memory architecture according to claim 1, wherein the multiplexing structure is configured to provide permutations of bytes for rotation of an image by a multiple of 90 degrees.

7. A method of providing efficient memory architecture for image processing, the method comprising:
   structuring the memory architecture as a multi-byte memory array having multiple data paths of equal multi-byte data width; and
   providing a multiplexing structure at the output of the memory array that selectively provides multi-byte data of the multi-byte data width containing a permutation of bytes chosen from among combinations of bytes on one or more of the data paths selected based on rotation, if any, of an image corresponding to the selected bytes.

8. The method according to claim 7, further comprising:
   combining one or more individual bytes from the one or more multi-byte data paths to create permutations of multi-byte data of the multi-byte data width based on a desired image rotation operation; and
   selecting one of the created permutations of multi-byte data based on the desired image rotation operation.

9. The method according to claim 7, further comprising:
   configuring the multiplexing structure to provide different permutations of byte combinations based on changing image rotation requirements.

10. The method according to claim 7, wherein the multiplexing structure comprises a two-level hierarchy of multiplexers, wherein a first level of multiplexers is configured to select combinations of bytes that are valid based on the image rotation, if any, and a second level of multiplexers is configured to receive an output from the first level of multiplexers.

11. The method according to claim 10, wherein the second level of multiplexers is configured to select one of the created permutations of multi-byte data based on the desired image rotation operation.

12. The method according to claim 7, wherein the multiplexing structure comprises a two-level hierarchy of multiplexers, wherein the first level of multiplexers is configured to combine one or more individual bytes from the one or more multi-byte data paths to create permutations of multi-byte data of the multi-byte data width based on a desired image rotation operation.

13. The method according to claim 7, further comprising:
   using the memory architecture to rotate an image by a multiple of 90 degrees.

14. A memory architecture for image processing, the memory architecture comprising:
   a memory array having multiple multi-byte memory data paths of equal multi-byte data width; and
   a multiplexing structure connected to the output of the multiple multi-byte data paths, the multiplexing structure configured to selectively provide multi-byte data of the multi-byte data width containing a permutation of bytes chosen from among combinations of bytes on one or more of the data paths selected based on rotation, if any, of an image corresponding the selected byte combinations,
   wherein the memory architecture is configured to at least one of: rotate an image, separate an image into luma and chroma planes, image mirror and generate planar data from an image.

15. The memory architecture according to claim 14, wherein the multiplexing structure comprises a two-level hierarchy of multiplexers, wherein a first level of multiplexers is configured to select combinations of bytes that are valid based on the image rotation, if any, and a second level of multiplexers is configured to receive an output from the first level of multiplexers and to select one of the combinations of bytes.

16. The memory architecture according to claim 15, wherein the first level of multiplexers is configured to combine one or more individual bytes from the one or more multi-byte data paths to create permutations of multi-byte data of the multi-byte data width based on a desired image rotation operation.

17. The memory architecture according to claim 15, wherein the second level of multiplexers is configured to select one of the created permutations of multi-byte data paths based on the desired image rotation operation.

18. The memory architecture according to claim 14, wherein the multiplexing structure is configurable to provide different permutations of byte combinations based on changing image rotation requirements.

19. The memory architecture according to claim 14, wherein the memory architecture is configured to rotate an image by 90 degrees.

20. The memory architecture according to claim 14, wherein the memory architecture is configured to rotate an image by any multiple of 90 degrees.

* * * * *

UNITED STATES PATENT AND TRADEMARK OFFICE
CERTIFICATE OF CORRECTION

| | |
|---|---|
| PATENT NO. | : 8,605,098 B2 |
| APPLICATION NO. | : 11/648125 |
| DATED | : December 10, 2013 |
| INVENTOR(S) | : Chandra |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1867 days.

Signed and Sealed this
Ninth Day of February, 2016

Michelle K. Lee
*Director of the United States Patent and Trademark Office*